United States Patent
Qu et al.

(10) Patent No.: US 12,028,657 B2
(45) Date of Patent: Jul. 2, 2024

(54) PROJECTION DEVICE AND KEYSTONE CORRECTION METHOD THEREOF

(71) Applicant: ALi Corporation, Hsinchu (TW)

(72) Inventors: Ben-Xiang Qu, Guangdong (CN); Zhao-Dong Zhang, Guangdong (CN)

(73) Assignee: ALi Corporation, Hsinchu (TW)

( * ) Notice: Subject to any disclaimer, the term of this patent is extended or adjusted under 35 U.S.C. 154(b) by 411 days.

(21) Appl. No.: 17/464,695

(22) Filed: Sep. 2, 2021

(65) Prior Publication Data

US 2022/0141434 A1 May 5, 2022

(30) Foreign Application Priority Data

Oct. 30, 2020 (CN) .......................... 202011186467.1

(51) Int. Cl.
*H04N 9/31* (2006.01)
*G06T 3/00* (2024.01)
*G06T 7/60* (2017.01)

(52) U.S. Cl.
CPC ............. *H04N 9/3185* (2013.01); *G06T 3/00* (2013.01); *G06T 7/60* (2013.01); *H04N 9/3188* (2013.01)

(58) Field of Classification Search
CPC .. H04N 9/3185; H04N 9/3188; H04N 9/3179; H04N 9/646; G06T 3/00;
(Continued)

(56) References Cited

U.S. PATENT DOCUMENTS

| 7,441,906 B1* | 10/2008 | Wang ...................... G03B 21/14 |
| | | 353/121 |
| 7,705,862 B1* | 4/2010 | Teng .................... H04N 9/3185 |
| | | 345/647 |

(Continued)

FOREIGN PATENT DOCUMENTS

| CN | 102148949 | 8/2011 |
| CN | 106101675 | 11/2016 |

(Continued)

OTHER PUBLICATIONS

Shouzheng Shi et al., "Improvement of Area Calculation Method of Patch on Earth Ellipsoid", Geomatics and Information Science of Wuhan University, May 2018, with English abstract, pp. 779-785, vol. 43, No. 5.
(Continued)

*Primary Examiner* — Magda Cruz
(74) *Attorney, Agent, or Firm* — JCIPRNET

(57) ABSTRACT

A projection device and a keystone correction method thereof are provided. The keystone correction method is adapted for the projection device and includes the following steps. A first image is obtained. A first line-taking position parameter is determined according to a ratio of a first target edge length to a second target edge length. At least one line of input pixels disposed in a first direction is retrieved from the first image according to the first line-taking position parameter. A first scaling process related to the first direction is performed according to at least one line of input pixels of the first image, such that a line of output pixels of a second image disposed in the first direction is generated. The projection device projects the second image onto a projection screen to display a rectangular projected image.

10 Claims, 8 Drawing Sheets

(58) Field of Classification Search
CPC ... G06T 7/60; G06T 2207/20021; G06T 7/33; G03B 21/147
See application file for complete search history.

(56) References Cited

U.S. PATENT DOCUMENTS

| | | | |
|---|---|---|---|
| 8,396,322 B1* | 3/2013 | Woodall | H04N 9/3152 |
| | | | 382/277 |
| 2006/0203207 A1* | 9/2006 | Ikeda | H04N 9/3185 |
| | | | 353/70 |
| 2012/0062855 A1 | 3/2012 | Todoroki | |
| 2014/0267341 A1* | 9/2014 | Imai | H04N 9/3185 |
| | | | 345/581 |
| 2014/0285777 A1* | 9/2014 | Inoue | H04N 9/3185 |
| | | | 353/70 |
| 2020/0389632 A1* | 12/2020 | Chien | H04N 9/3194 |

FOREIGN PATENT DOCUMENTS

| | | |
|---|---|---|
| CN | 107238996 | 10/2017 |
| CN | 109151418 | 1/2019 |
| JP | 2016134686 | 7/2016 |
| WO | 2018120011 | 7/2018 |

OTHER PUBLICATIONS

"Office Action of China Counterpart Application", issued on May 30, 2023, p. 1-p. 6.

* cited by examiner

PROJECTION DEVICE AND KEYSTONE CORRECTION METHOD THEREOF

CROSS-REFERENCE TO RELATED APPLICATION

This application claims the priority benefit of China application serial no. 202011186467.1, filed on Oct. 30, 2020. The entirety of the patent application is hereby incorporated by reference herein and made a part of this specification.

BACKGROUND

Technical Field

The disclosure relates to a projection technique, particularly to a projection device and keystone correction method thereof.

Description of Related Art

With the advancement of technology, projectors of various kinds have been widely used in many occasions, such as presentations, speeches, theaters, audio-visual teaching, interactive teaching, and home theater, etc. The projector is a display device for generating images for projection. The imaging principle of the projector is to convert the illumination light beam generated by an illumination system into an image light beam through a light valve. The image light beam then passes a projection lens to be projected onto a projection screen or a wall to form a projected image.

When the optical axis of the lens of the projector is not perpendicular to the projection screen or the wall, the projected image on the projection screen or the wall suffers from the keystone distortion. And this reduces the projection quality. In other words, only when the optical axis of the lens of the projector is perpendicular to the projection surface will the projected image not be distorted. Although the user can adjust manually the location and the way of arranging the projector, not only is the projected image restricted by the environment so that the user often cannot adjust the projected image to an ideal state, but such adjustment is also a time-consuming and tedious work. Currently, many methods have been proposed to improve or to solve the keystone distortion. For example, the keystone distortion of the projected image can be corrected by adopting an optical method. Or, the keystone distortion of the projected image can be corrected by disposing an image processing chip in the projection device to perform the pre-distortion image processing. However, the optical keystone correction raises the cost of the projector and is also more difficult to be implemented. Therefore, it is a topic of concern for those skilled in the art to work out the implementation of a pre-distortion image process that brings good correction effect with low cost.

SUMMARY

The present disclosure provides a projection device and a keystone correction method thereof, capable of preventing a projected image after the keystone correction from deformation or distortion, thereby improving the quality of the projected image.

The embodiments of the present disclosure provide a keystone correction method adapted for a projection device. The method includes the following steps. The first image is obtained. A first line-taking position parameter is determined according to a ratio of a first target edge length to a second target edge length. At least one line of input pixels disposed in a first direction is retrieved from the first image according to the first line-taking position parameter. A first scaling process related to the first direction is performed according to at least one line of input pixels of the first image, and a line of output pixels of a second image disposed in the first direction is generated. The projection device projects the second image onto the projection screen to display a rectangular projected image.

The embodiments of the present disclosure provide a projection device, including an image processing circuit and a projection module. The image processing circuit is configured to perform the following steps. A first image is obtained. A first line-taking position parameter is determined according to a ratio of a first target edge length to a second target edge length. At least one line of input pixels disposed in the first direction is retrieved from the first image according to the first line-taking position parameter. A first scaling process related to the first direction is performed according to at least one line of input pixels of the first image, such that a line of output pixels of the second image disposed in the first direction is generated. The projection module is coupled to the image processing circuit, and is adapted to project the second image onto a projection screen to display a rectangular projected image.

Based on the above, in the embodiments of the present disclosure, before performing the image scaling process corresponding to a certain direction, the line-taking position parameter is determined according to the ratio of the two target edge lengths. Then, input pixels of the input image are retrieved according to the line-taking position parameter to perform vertical scaling process or horizontal scaling process to generate a certain row or a certain column of output pixels of the second image. This way, by retrieving the input pixels of the input image according to the non-linear corresponding rule to generate the output pixels undergone the image scaling process, the distortion or deformation of the projected image undergone the keystone correction can be avoided, thereby improving the quality of the projected image.

To make the above features and advantages of the present disclosure more comprehensible, several embodiments accompanied with drawings are described in detail as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

Figure 1A:
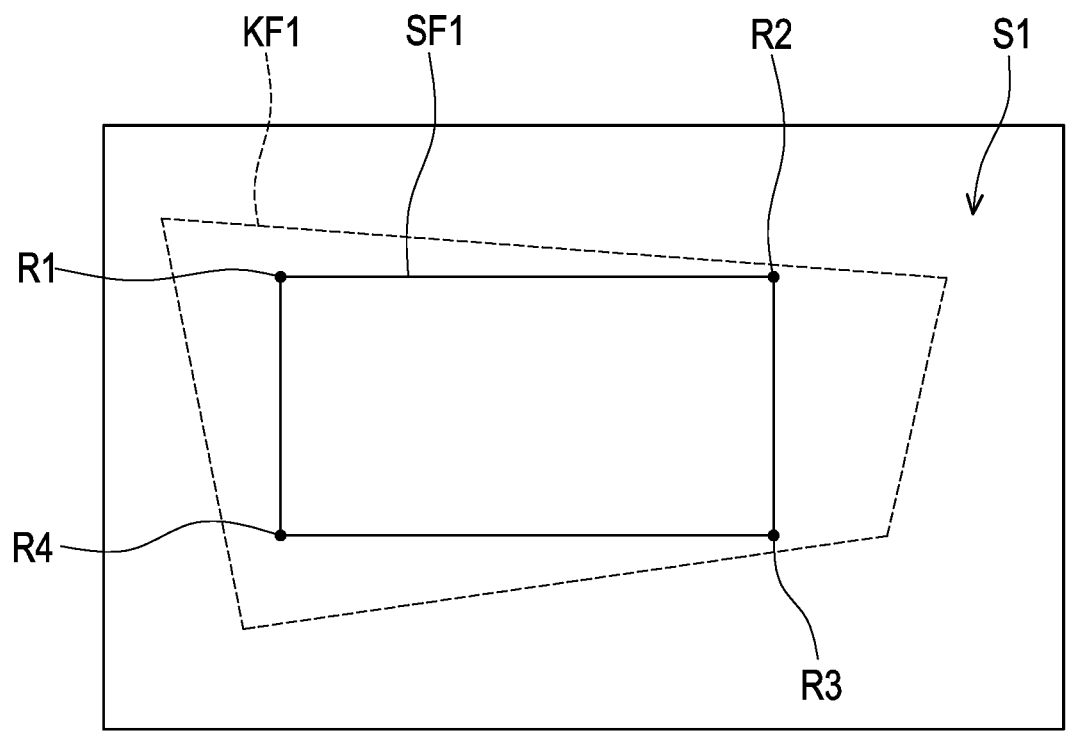
FIG. 1A is a schematic diagram of a projection device according to an embodiment of the present disclosure performing projection.
Figure 1A:
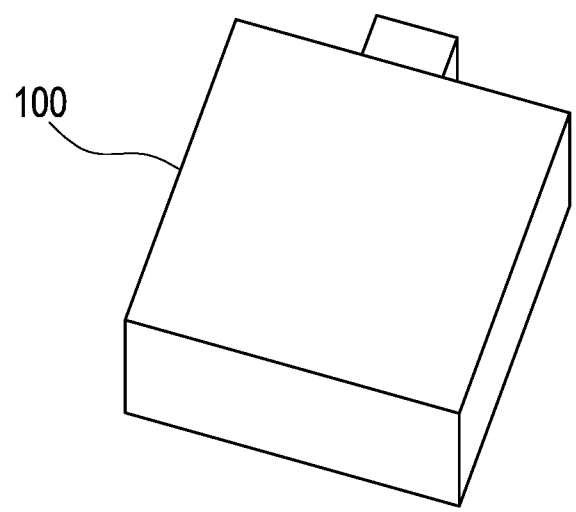

References of the exemplary embodiments of the disclosure are to be made in detail. Examples of the exemplary embodiments are illustrated in the drawings. When applicable, the same reference numerals in the drawings and the descriptions indicate the same or similar parts.

Figure 1B:
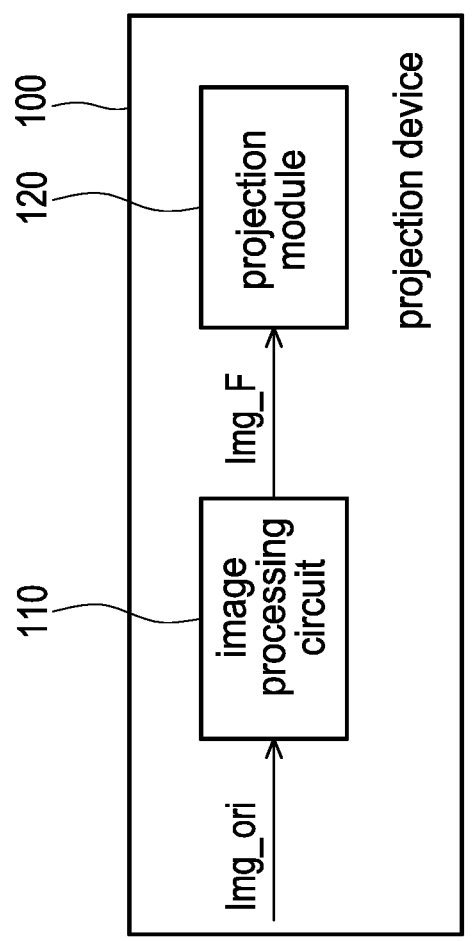
FIG. 1B is a schematic view of a projection device according to an embodiment of the disclosure.

FIG. 1A is a schematic diagram of a projection device according to an embodiment of the present disclosure performing projection. FIG. 1B is a schematic view of a projection device according to an embodiment of the disclosure. In FIG. 1A and FIG. 1B, a projection device 100 projects an image on a projection screen S1, which may be a liquid crystal projector (LCP), a digital light processing (DLP) projector, or a liquid crystal on silicon (LCOS) projector, and so on. In this embodiment, the projection device 100 may include an image processing circuit 110 and a projection module 120. The projection module 120 may include a light source module, an optical engine module, a lens module, and related optical and circuit control components. The projection device 100 receives an original image Img_ori through the data transmission interface. The image processing circuit 110 is adapted to perform image process on the original image Img_ori. The projection module 120 then projects a result image Img_F generated by the image process onto the projection screen S1.

Note that when an optical axis of a lens of the projection device is not perpendicular to the projection screen S1, a projected image KF1 projected by the projection device 100 is keystoning. In the embodiments of the present disclosure, in order to implement the function of keystone correction, the image processing circuit 110 may perform pre-distortion image process on the original image Img_ori, so that the projection device 100 projects a rectangular projected image SF1 on the projection screen S1. The image processing circuit 110 implements the pre-distortion image process of keystone correction by performing horizontal scaling process or/and vertical scaling process on the original image Img_ori. More specifically, the image processing circuit 110 performs image scaling process on the original image Img_ori according to the coordinate information of rectangular positioning points R1 to R4 to generate the result image Img_F. Therefore, when the projection module 120 projects the result image Img_F generated by the image scaling process, the rectangular projected image SF1 is displayed on the projection screen S1.

Figure 2:
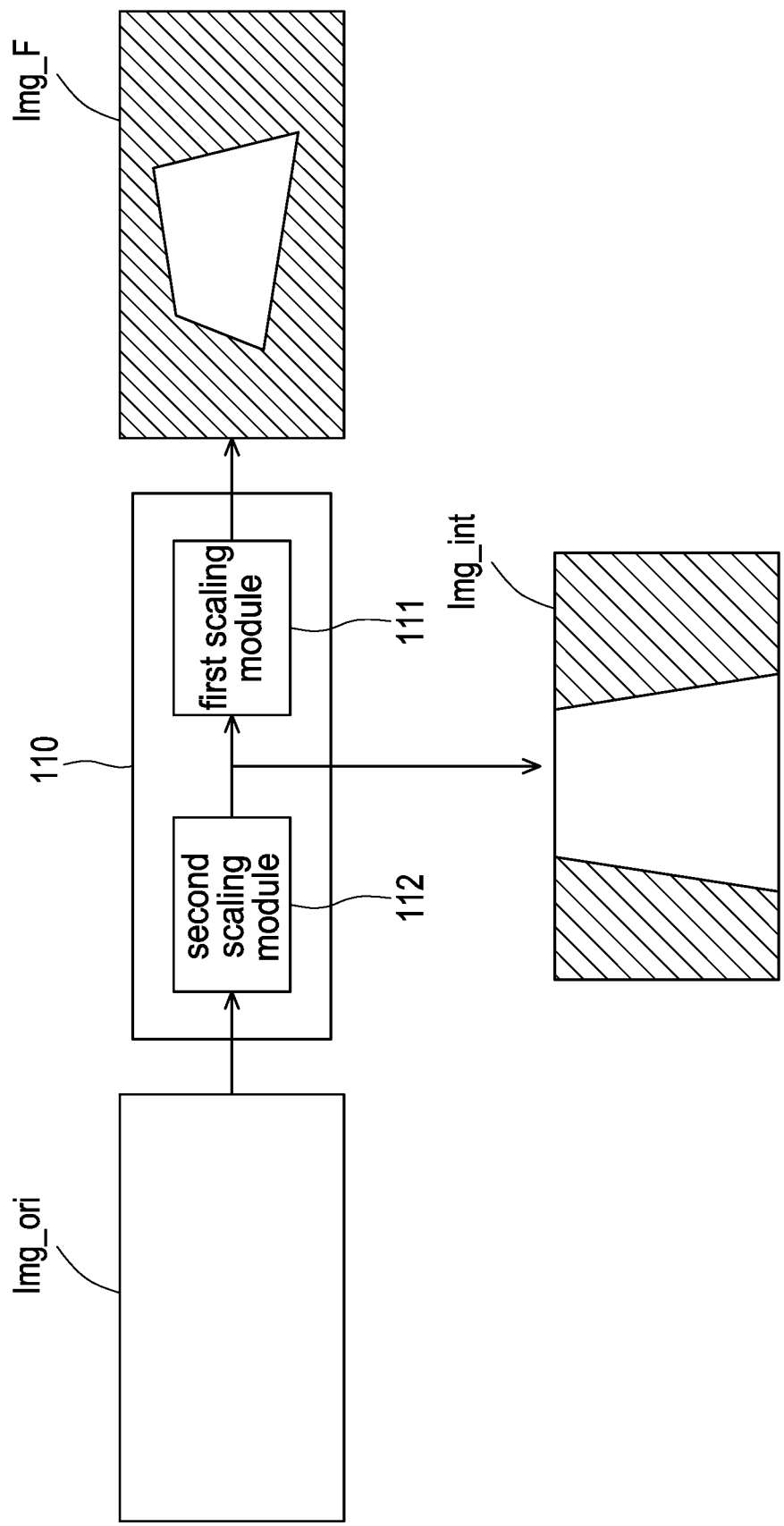
FIG. 2 is a schematic view of an image processing circuit according to an embodiment of the disclosure.

FIG. 2 is a schematic view of an image processing circuit according to an embodiment of the disclosure. In FIG. 2, an image processing circuit 110 includes a first scaling module 111 and a second scaling module 112. In this embodiment, the first scaling module 111 performs a first scaling process related to a first direction on an intermediate image Img_int (i.e., a first image) to generate a result image Img_F (i.e., a second image). In addition, the second scaling module 112 may perform a second scaling process related to a second direction on an original image Img_ori (i.e., the third image) to generate the intermediate image Img_int. The first direction is perpendicular to the second direction. In other words, when the first direction is a vertical direction, then the second direction is a horizontal direction. If the first direction is the horizontal direction, the second direction is the vertical direction. In the embodiment of FIG. 2, the second scaling module 112 performs horizontal scaling process, whereas the first scaling module 111 performs vertical scaling process. However, the present disclosure does not impose any restrictions on the order of the horizontal scaling process and the vertical scaling process. In other embodiments, the second scaling module 112 may first perform vertical scaling process before the first scaling module 111 performs horizontal scaling process.

Incidentally, in this embodiment, the intermediate image Img_int (i.e., the first image) is an image generated by performing any one of horizontal scaling process or vertical scaling process on the original image Img_ori (i.e., the third image), and the result image Img_F (i.e., the second image) is an image generated by applying the other process of the horizontal scaling process or the vertical scaling process to the intermediate image Img_int (i.e., the first image).

In addition, note that the reduction ratios of the first scaling module 111 and the second scaling module 112 for each row or each column of pixels are not fixed values; therefore, both the first scaling module 111 and the second scaling module 112 convert the rectangular input image into a keystone image block. Then, each time the vertical scaling process or the horizontal scaling process is completed, both the first scaling module 111 and the second scaling module 112 fill the areas around the keystone image block with the surrounding background color blocks. As FIG. 2 shows exemplarily, after the second scaling module 112 performs the second scaling process on the original image Img_ori, the areas around the keystone image block are filled with the surrounding background color blocks (that is, the areas with diagonal lines shown in FIG. 2) to generate the intermediate image Img_int. Similarly, after the first scaling module 111 performs the first scaling process on the intermediate image Img_int, the areas around the keystone image block are filled with the surrounding background color blocks to generate the result image Img_F. Based on this, when the projection module 120 of the projection device 100 projects the result image Img_F onto the projection screen S1, the surrounding background color blocks of the result image Img_F does not present any image content. Therefore, when the projection module 120 of the projection device 100 projects the result image Img_F onto the projection screen S1, a rectangular projected image SF1 is displayed on the projection screen S1, thereby achieving the function of keystone correction. The surrounding background color block mentioned above may be black or in other colors, and the present disclosure is not limited thereto.

Figure 3A:
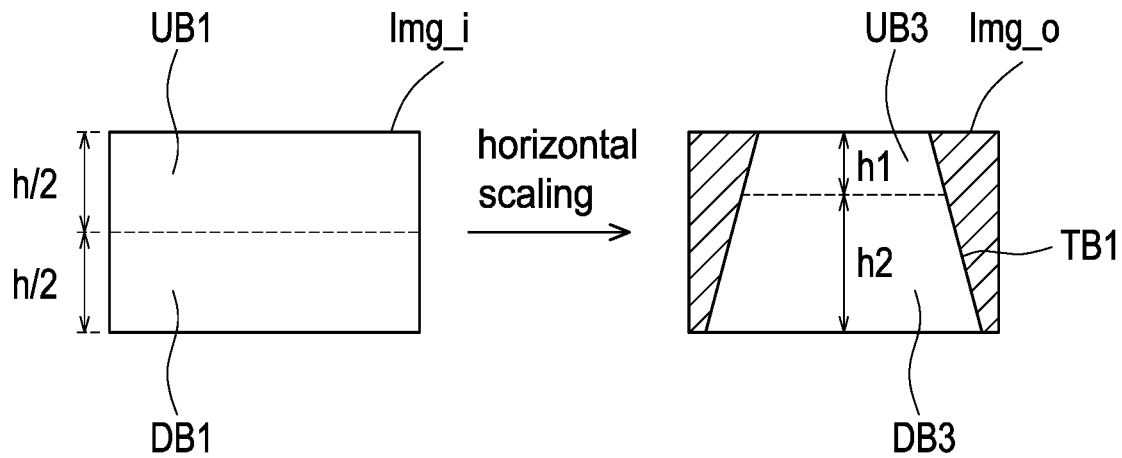
FIG. 3A is a schematic view of a horizontal scaling process according to an embodiment of the present disclosure.

It is worth mentioning that, in an embodiment of the present disclosure, when performing the horizontal scaling process and the vertical scaling process, the first scaling module 111 and the second scaling module 112 retrieve the input pixels of the input image according to the non-linear corresponding rule to generate output pixels. For specific details, please refer to FIG. 3A, which is a schematic view of horizontal scaling process according to an embodiment of the present disclosure. In FIG. 3A, when performing horizontal scaling process, a first scaling module 111 or a second scaling module 112 in an image processing circuit 110 generates an upper-half image block UB3 of a target keystone image block TB1 in an output image Img_o according to an upper-half image block UB1 of an input image Img_i, in which a block height h/2 of the upper-half image block UB1 of the input image Img_i is different from a block height h1 of the upper-half image block UB3 of the target keystone image block TB1. In addition, when performing horizontal scaling process, the first scaling module 111 or the second scaling module 112 in the image processing circuit 110 generates an lower-half image block DB3 of the target keystone image block TB1 in the output image Img_o according to an lower-half image block DB1 of the input image Img_i, in which a block height h/2 of the lower-half image block DB1 of the input image Img_i is different from a block height h2 of the lower-half image block DB3 of the target keystone image block TB1.

Figure 3B:
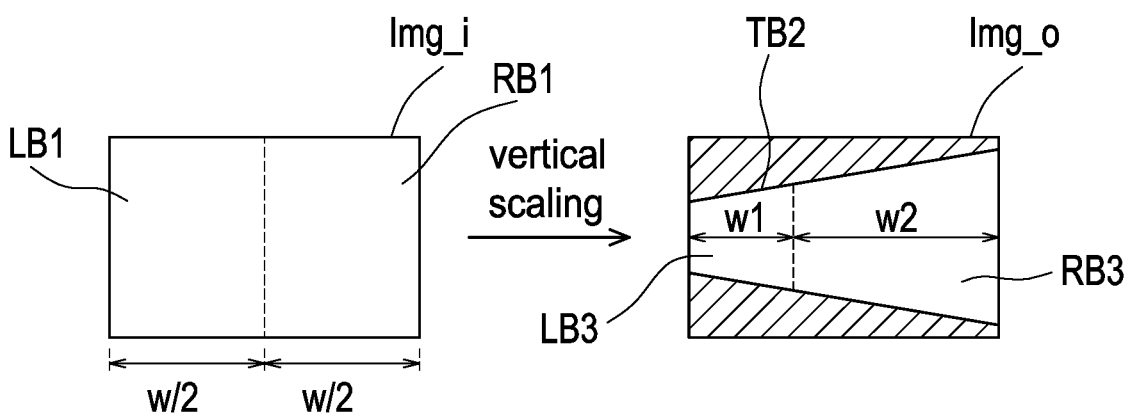
FIG. 3B is a schematic view of a vertical scaling process according to an embodiment of the disclosure.

Please refer to FIG. 3B, which is a schematic view of a vertical scaling process with similar principle according to an embodiment of the disclosure. In FIG. 3B, when performing vertical scaling process, a first scaling module 111 or a second scaling module 112 in an image processing circuit 110 generates a left-half image block LB3 of a target keystone image block TB2 in an output image Img_o according to a left-half image block LB1 of an input image Img_i, in which a block width w/2 of the left-half image block LB1 of the input image Img_i is different from a block width w1 of the left-half image block LB3 of the target keystone image block TB2. Furthermore, when performing vertical scaling process, the first scaling module 111 or the second scaling module 112 in the image processing circuit 110 generates a right-half image block RB3 of the target keystone image block TB2 in the output image Img_o according to a right-half image block RB1 of an input image Img_i, in which a block width w/2 of the right-half image block RB1 of the input image Img_i is different from a block width w2 of the right-half image block RB3 of the target keystone image block TB2. Here, the input image Img_i shown in FIG. 3A and FIG. 3B may be the original image Img_ori or the intermediate image Img_int shown in FIG. 2.

Embodiments are listed hereinafter to describe the implementation details of image scaling process performed by the image processing circuit 110.

Figure 4:
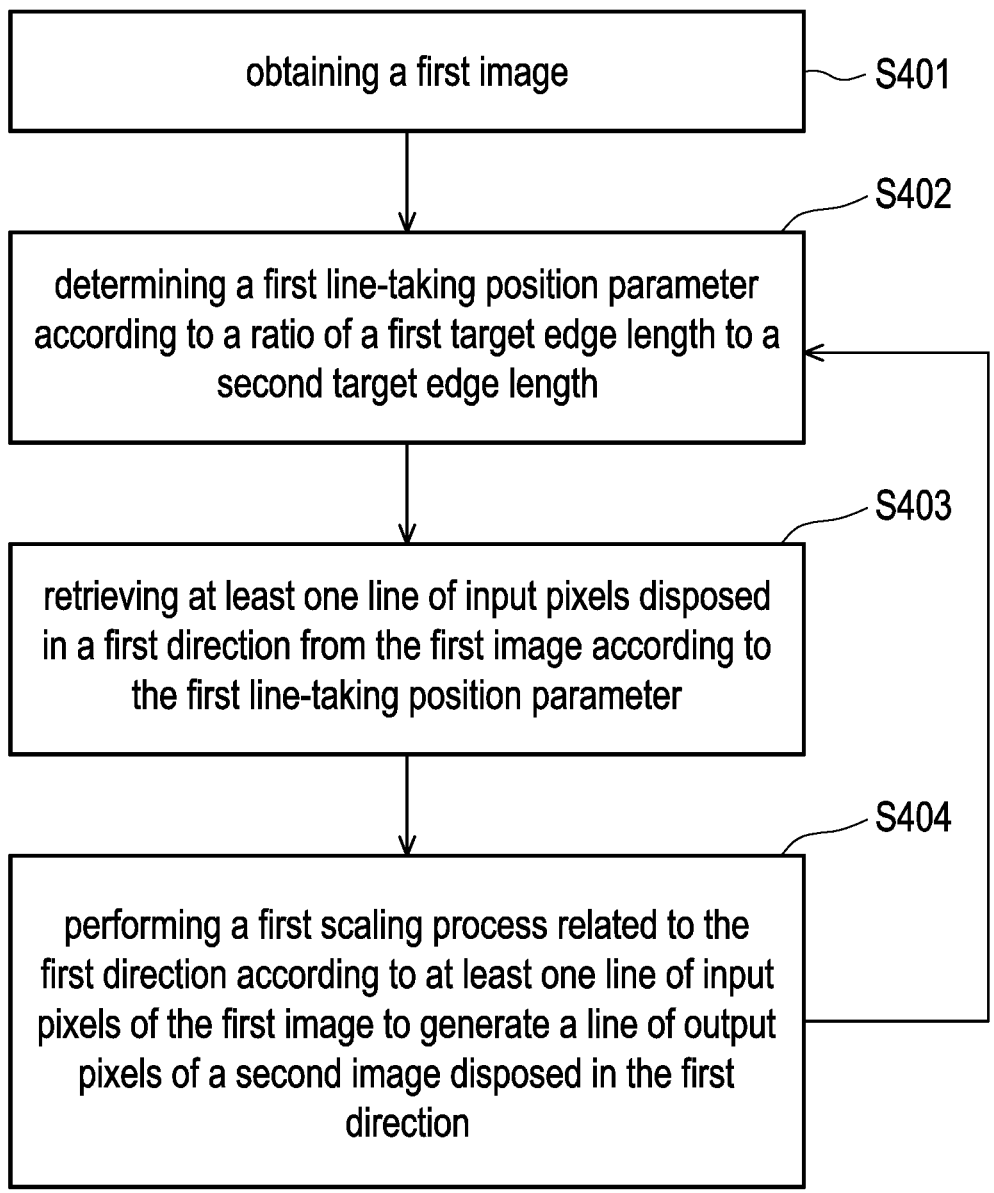
FIG. 4 is a flowchart of a keystone correction method according to an embodiment of the disclosure.

FIG. 4 is a flowchart of a keystone correction method according to an embodiment of the disclosure. And the method flow of FIG. 4 may be implemented by the image processing circuit 110 of FIG. 1B and FIG. 2. First, in step S401, a first image (for example, the intermediate image Img_int in FIG. 2) is obtained by a first scaling module 111 of an image processing circuit 110. In step S402, a first line-taking position parameter is determined by the image processing circuit 110 according to a ratio of a first target edge length to a second target edge length. Here, when generating a line of output pixels disposed in the first direction, the first line-taking position parameter is adapted to determine a position coordinate of input pixels of the image scaling process in the first direction (for example, the X-coordinate component or the Y-coordinate component of input pixels). Note that the first target edge length and the second target edge length are respectively the lengths of the two bottom edges of the target keystone image block, whereas the first scaling module 111 of the image processing circuit 110 converts the first image into the target keystone image block through the first scaling process. The image processing circuit 110 determines the first line-taking position parameter according to the ratio of the lengths of the two bottom edges of the target keystone image block. In one embodiment, the target keystone image block is determined according to the coordinate information of rectangular positioning points R1 to R4 shown in FIG. 1A. Specifically, the image processing circuit 110 determines the target keystone image block according to the coordinate information of the rectangular positioning points R1 to R4 and the perspective relationship.

Figure 5:
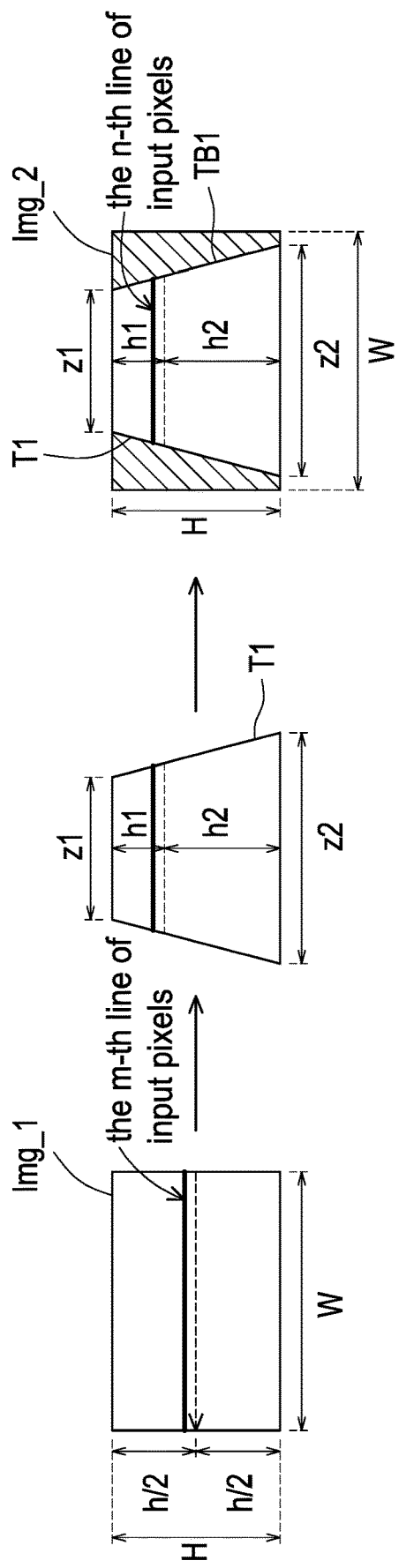
FIG. 5 is a schematic view of a horizontal scaling process according to an embodiment of the present disclosure.
Figure 6:
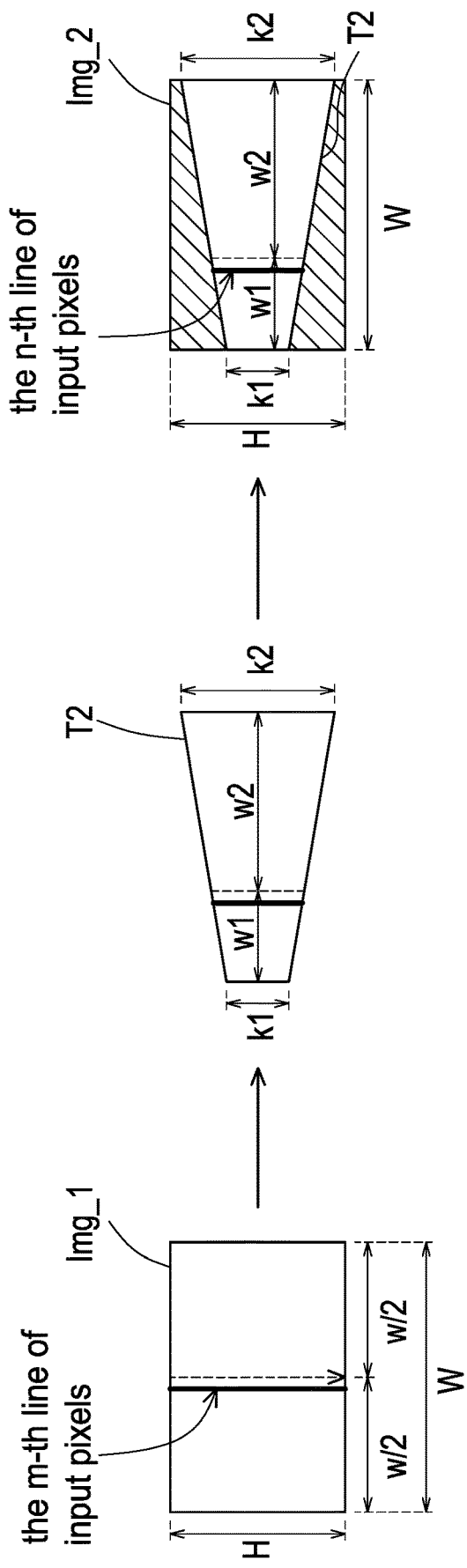
FIG. 6 is a schematic view of a vertical scaling process according to an embodiment of the present disclosure.

FIG. 5 shows a schematic view of a horizontal scaling process according to an embodiment of the present disclosure, as an example assuming that the first scaling process is the horizontal scaling process. In FIG. 5, it is assumed that the predetermined image height of a first image Img1 is H, and the predetermined image width is W. A first scaling module 111 converts the first image Img1 into a target keystone image block T1 through horizontal scaling process, and fills the area around the target keystone image block T1 with the surrounding background color blocks to generate a second image Img2. The lengths of the two bottom edges of the target keystone image block T1 are respectively a first target edge length z1 and a second target edge length z2. The image processing circuit 110 may calculate a first line-taking position parameter according to a ratio of the first target edge length z1 to the second target edge length z2, such that in the subsequent steps, the first scaling module 111 may determine which input pixels are acquired to generate a row of input pixels according to the first line-taking position parameter. FIG. 6 shows a schematic view of a vertical scaling process according to an embodiment of the present disclosure, as an example assuming that the first scaling process is a vertical scaling process. In FIG. 6, it is assumed that the predetermined image height of a first image Img1 is H, and the predetermined image width is W. A first scaling module 111 converts the first image Img1 into a target keystone image block T2 through vertical scaling process, and fills the area around the target keystone image block T2 with the surrounding background color blocks to generate a second image Img2. The lengths of the two bottom edges of the target keystone image block T2 are respectively a first target edge length k1 and a second target edge length k2. The image processing circuit 110 may calculate a first line-taking position parameter according to a ratio of the first target edge length k1 to the second target edge length k2, such that in the subsequent steps, the first scaling module 111 may determine which input pixels are acquired to generate a column of input pixels according to the first line-taking position parameter. Similarly, the surrounding background color block mentioned above may be black or in other colors, and the present disclosure is not limited thereto.

In step S403, at least one line of input pixels disposed in the first direction is retrieved by the first scaling module 111 of the image processing circuit 110 from the first image according to the first line-taking position parameter. Note that when the first scaling module 111 performs horizontal scaling process, the first direction is the horizontal direction, and at least one line of input pixels includes at least one row of input pixels of the first image. When the first scaling module 111 performs vertical scaling process, the first direction is the vertical direction, and at least one line of input pixels includes at least one column of input pixels of the first image.

In step S404, the first scaling process related to the first direction is performed by the first scaling module 111 of the image processing circuit 110 according to at least one line of input pixels of the first image to generate a line of output pixels of the second image disposed in the first direction. In one embodiment, the first scaling module 111 performs the first scaling process at least according to the m-th line of input pixels of the first image to generate the n-th line of output pixels of the second image, where n is an integer greater than and/or equal to 1, and less than and/or equal to s. When n is an integer greater than 1 and less than s, n is not equal to m; and when n is equal to 1 or n is equal to s, m is equal to n. And, when the first direction is the horizontal direction, s is equal to a predetermined image height; when the first direction is the vertical direction, s is equal to the predetermined image width. Take FIG. 5 as an example. When generating the n-th row of output pixels of the second image Img2 disposed in the horizontal direction, the first scaling module 111 determines to retrieve the m-th row of input pixels (or, the m-th row of input pixels and the (m+1)th line of input pixels) of the first image based on the first line-taking position parameter. Then, the first scaling module 111 performs horizontal scaling process according to the m-th row of input pixels (or, the m-th row of input pixels and the (m+1)th row of input pixels) of the first image to generate the n-th row of output pixels of the second image Img2 disposed in the horizontal direction. In other words, as in the example of the horizontal scaling process in FIG. 3A and FIG. 5, in one embodiment, when the first direction is the horizontal direction, an image block of the second image is generated by performing the first scaling process related to the horizontal direction on another image block of the first image, and the image block height of the image block is different from the image block height of another image block.

Take FIG. 6 as an example. When generating the n-th column of output pixels of the second image Img2 disposed in the vertical direction, the first scaling module 111 determines to retrieve the m-th column of input pixels (or, the m-th column of input pixels and the (m+1)th column of input pixels) of the first image based on the first line-taking position parameter. Then, the first scaling module 111 performs vertical scaling process according to the m-th column of input pixels (or, the m-th column of input pixels and the (m+1)th column of input pixels) of the first image to generate the n-th column of output pixels of the second image Img2 disposed in the vertical direction. In other words, as in the examples of the horizontal scaling process in FIG. 3B and FIG. 6, in one embodiment, when the first direction is the vertical direction, an image block of the second image is generated by performing the first scaling process related to the vertical direction on another image block of the first image, and the image block width of the image block is different from the image block width of another image block.

However, the present disclosure does not impose any restrictions on the pixel interpolation algorithm for horizontal scaling process and vertical scaling process, which may be provided according to actual applications. By executing steps S402 to S404 repeatedly, the image processing circuit 110 generates every line of output pixels of the second image. Then, the projection device 100 projects the second image onto the projection screen to display a rectangular projected image.

The implementation details of determining the first line-taking position parameter are described below.

In one embodiment, the image processing circuit 110 obtains the first line-taking position parameter by inputting into a predetermined function the ratio of the first target edge length to the second target edge length, a predetermined image size, and a position coordinate of a line of output pixels in the second direction. In one embodiment, when the first line-taking position parameter is an integer, the position coordinate (X-coordinate component or Y-coordinate component) of at least one line of input pixels in the second direction is equal to the first line-taking position parameter; and, when the first line-taking position parameter is a non-integer and includes an integer part, the position coordinate of at least one line of input pixels in the second direction is equal to the integer part of the first line-taking position parameter and the integer part plus one. In other words, when the first line-taking position parameter is i, and i is an integer, the image processing circuit 110 retrieves the i-th line of input pixels of the first image, and performs the first scaling process to generate a line of output pixels of the second image. If the first line-taking position parameter is i, and i is a non-integer, the image processing circuit 110 retrieves the i-th line of input pixels and the (i+1)th line of input pixels of the first image to perform the first scaling process and generates a line of output pixels of the second image.

More specifically, when performing horizontal scaling process, the predetermined image size is the predetermined image height of the input image, and the predetermined function may be expressed as the following Equation (1).

$$yr_{ori}=(yr_{ob}*(h-1))/((h-1)*k-yr_{ob}*(k-1)) \quad \text{Equation (1)}$$

Among the above: $yr_{ori}$ represents the first line-taking position parameter in this embodiment; $yr_{ob}$ represents the Y-coordinate component of the output image; h is the predetermined image height of the input image; and, k represents the ratio of the first target edge length to the second target edge length. Take FIG. 5 as an example, assuming that k is equal to z1/z2=0.8, and h=1080. When a row of output pixels with the Y-coordinate component of 0 in the second image Img2 is to be generated, $yr_{ob}=0$ is substituted into Formula (1), and the first line-taking position parameter $yr_{ori}=0$. The image processing circuit 110 retrieves a row of input pixels with the Y-coordinate component of 0 in the first image Img1 and performs horizontal scaling process to generate a row of output pixels with the Y-coordinate component of 0 in the second image Img2. When a row of output pixels with the Y-coordinate component of 1 in the second image Img2 is to be generated, $yr_{ob}=1$ is substituted into Formula (1), and the first line-taking position parameter $yr_{ori}=1.12497$. The image processing circuit 110 retrieves two rows of input pixels with the Y-coordinate components respectively of 1 and 2 in the first image Img1 and performs horizontal scaling process to generate a row of output pixels with the Y-coordinate component of 1 in the second image Img2. The rest may be deduced by analogy.

In contrast, when performing vertical scaling process, the predetermined image size is the predetermined image width of the input image, and the predetermined function may be expressed as the following Equation (2).

$$Xr_{ori}=(xr_{ob}*(w-1))/((w-1)*k-xr_{ob}*(k-1)) \quad \text{Equation (2)}$$

Among the above: $xr_{ori}$ represents the first line-taking position parameter in this embodiment; $xr_{ob}$ represents the X-coordinate component of the output image; w is the predetermined image width of the input image; and, k represents the ratio of the first target edge length to the second target edge length. Take FIG. 6 as an example, assuming that k is equal to k1/k2. Likewise, the image processing circuit 110 may use Formula (2) to calculate the first line-taking position parameter, and then determine which input pixels are retrieved to perform vertical scaling process and generate output pixels. The operation here is similar to the aforementioned horizontal scaling processing, and is thus not repeated here.

The way how the first line-taking position parameter is determined by using the predetermined function is only one of the embodiments. Another embodiment for determining the first line-taking position parameter is described below.

In one embodiment, an image processing circuit 110 calculates a first image-size parameter and a second image-size parameter according to a predetermined image size and a ratio of a first target edge length to a second target edge length. Take FIG. 5 as an example for description. When performing horizontal scaling process, the first image-size parameter is the image block height h1, and the second image-size parameter is the image block height h2. The ratio of the image block height h1 to the image block height h2 is equal to the ratio of the first target edge length z1 to the second target edge length z2. Therefore, the image processing circuit 110 may calculate the first image-size parameter and second image-size parameter according to the predetermined image height H and the ratio of the first target edge length z1 to the second target edge length z2.

Then, the image processing circuit 110 may calculate the first line-taking step length according to the first image-size parameter and the predetermined image size, and calculate a second line-taking step length according to the second image-size parameter and the predetermined image size. When performing horizontal scaling process, as illustrated in FIG. 5, the image processing circuit 110 may calculate the first line-taking step length $incr_1$ and the second line-taking step length $incr_2$ according to the following Formula (3) and Formula (4).

$$incr_1 = h/(2*h1) \qquad \text{Formula (3)}$$

$$incr_2 = h/(2*h2) \qquad \text{Formula (4)}$$

Then, the image processing circuit 110 calculates and determines the first line-taking position parameter according to the first line-taking step length, the second line-taking step length, and the position coordinate of a line of output pixels in the second direction. In one embodiment, when performing horizontal scaling process, the image processing circuit 110 calculates the first line-taking position parameter yori according to Formula (5) to Formula (8) as follows.

$$\Delta INCR = (incr_2 - incr_1)/(h/2) \qquad \text{Equation (5)}$$

$$incr_{start} = incr_1 - \Delta INCR * (h_1/2) \qquad \text{Equation (6)}$$

$$incr_n = incr_{start} + \Delta INCR * (N-1) \qquad \text{Equation (7)}$$

$$y_{ori} = \begin{cases} \sum_{j=1}^{n} incr_j, \text{ when } Y - \text{coordinate component of} \\ \qquad \text{output pixels is not equal to } 0 \\ 0, \text{ when } Y - \text{coordinate component of output} \\ \qquad \text{pixels is equal to } 0 \end{cases} \qquad \text{Equation (8)}$$

Among the above, n is the Y-coordinate component of output pixels.

Based on this, the image processing circuit 110 determines to retrieve at least one row of input pixels of the input image according to the first line-taking position parameter $y_{ori}$, and generates a row of output pixels of the output image. Similar to the foregoing embodiments, when the first line-taking position parameter is an integer, the Y-coordinate component of at least one line of input pixels is equal to the first line-taking position parameter; and, when the first line-taking position parameter is a non-integer and includes an integer part, the Y-coordinate component of at least one line of input pixels is equal to the integer part of the first line-taking position parameter and the integer part plus one. Take FIG. 5 as an example, assuming that k is equal to z1/z2=0.8, and h=1080. When a row of output pixels with the Y-coordinate component of 0 in the second image Img2 is to be generated, the first line-taking position parameter $yr_{ori}=0$. The image processing circuit 110 retrieves a row of output pixels with the Y-coordinate component of 0 in the first image Img1 and performs horizontal scaling process to generate a row of output pixels with the Y-coordinate component of 0 in the second image Img2. When a row of output pixels with the Y-coordinate component of 1 in the second image Img2 is to be generated, then n=1, and the first line-taking position parameter $yr_{ori}$ $incr_1=incr_{start}=1.2250$. The image processing circuit 110 retrieves two rows of output pixels with the Y-coordinate components respectively of 1 and 2 in the first image Img1 and performs horizontal scaling process to generate a row of output pixels with the Y-coordinate component of 1 in the second image Img2. The rest may be deduced by analogy.

Likewise, take FIG. 6 as an example. When performing vertical scaling process, the first image-size parameter is the image block width w1, and the second image-size parameter is the image block width w2. The ratio of the image block width w1 to the image block width w2 is equal to the ratio of the first target edge length k1 to the second target edge length k2. Therefore, the image processing circuit 110 calculates the first image-size parameter and the second image-size parameter according to the predetermined image width W and the ratio of the first target edge length k1 to the second target edge length k2.

When performing vertical scaling process, as illustrated in FIG. 6, the image processing circuit 110 may calculate the first line-taking step length $incr_1$ and the second line-taking step length $incr_2$ according to the following Formula (9) and Formula (10).

$$incr_1 = w/(2*w1) \qquad \text{Formula (9)}$$

$$incr_2 = w/(2*w2) \qquad \text{Formula (10)}$$

Then, the image processing circuit 110 may calculate the first line-taking position parameter $x_{ori}$ according to Formula (11) to Formula (14) as follows.

$$\Delta INCR = (incr_2 - incr_1)/(w/2) \qquad \text{Equation (11)}$$

$$incr_{start} = incr_1 - \Delta INCR * (w1/2) \qquad \text{Equation (12)}$$

$$incr_n = incr_{start} + \Delta INCR * (N-1) \qquad \text{Equation (13)}$$

$$x_{ori} = \begin{cases} \sum_{j=1}^{n} incr_j, \text{ when } X - \text{coordinate component of} \\ \qquad \text{output pixels is not equal to } 0 \\ 0, \text{ when } X - \text{coordinate component of} \\ \qquad \text{output pixels is equal to } 0 \end{cases} \qquad \text{Equation (14)}$$

Among the above, n is the X-coordinate component of output pixels. Based on this, the image processing circuit 110 determines to retrieve at least one column of input pixels of the input image according to the first line-taking position parameter xori, and generates a column of output pixels of the output image. The operation here is similar to the aforementioned horizontal scaling processing, and is thus not repeated here.

Figure 7:
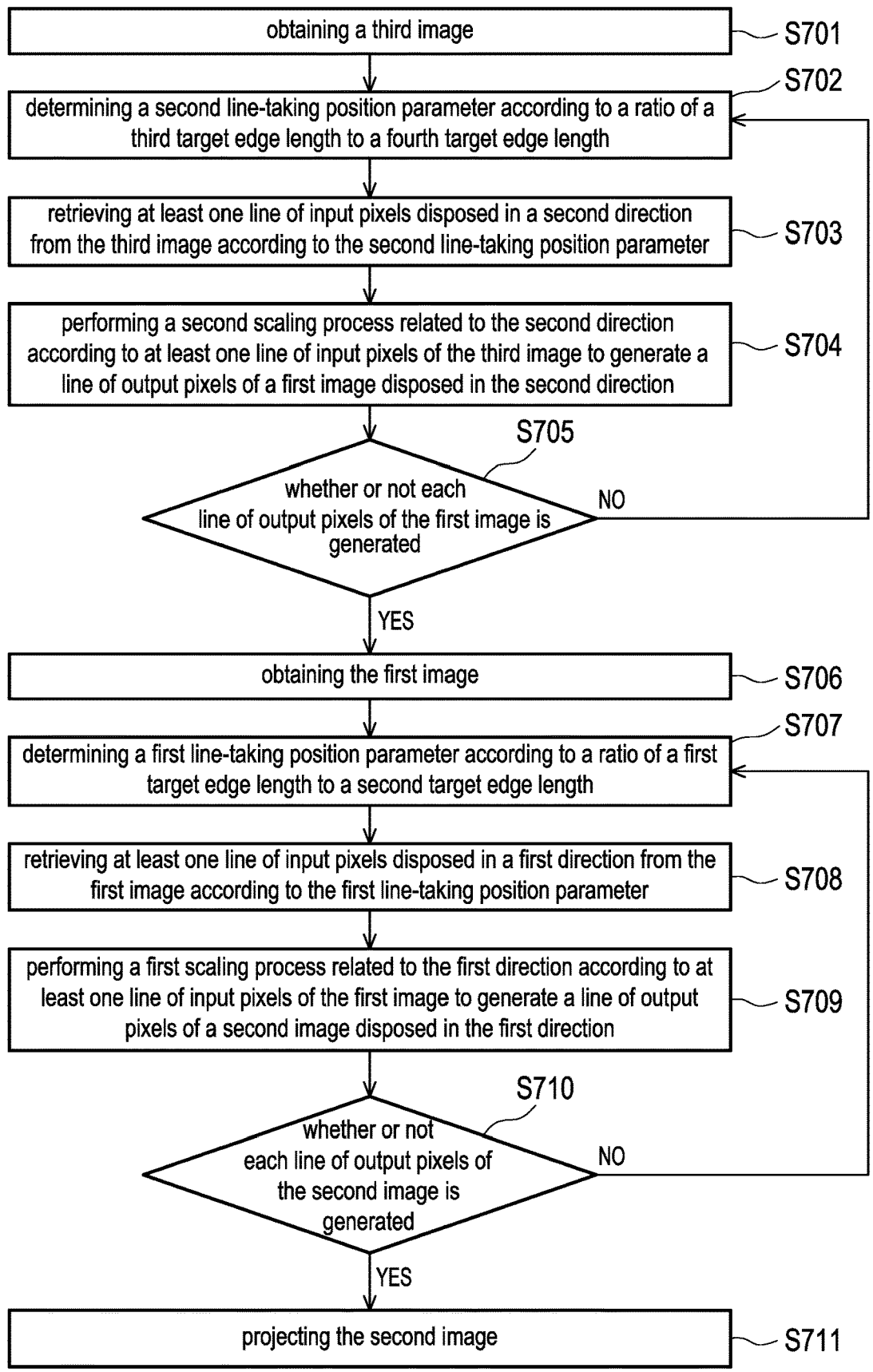
FIG. 7 is a flowchart of a keystone correction method according to an embodiment of the disclosure.

FIG. 7 is a flowchart of a keystone correction method according to an embodiment of the disclosure. As sufficient teachings, suggestions, and implementations may be obtained from the above description of the embodiments of FIG. 1 to FIG. 6, the relevant implementation details and relevant device features of the keystone correction method of the present embodiment are not repeated herein.

In step S701, a third image is obtained by a second scaling module 112 of an image processing circuit 110. In step S702, a second line-taking position parameter is determined by the image processing circuit 110 according to a ratio of a third target edge length to a fourth target edge length. Note that the third target edge length and the fourth target edge length are respectively the lengths of the two bottom edges of the target keystone image block, whereas the second scaling module 112 of the image processing circuit 110 converts the third image into a target keystone image block through a second scaling process. In step S703, at least one line of input pixels disposed in the second direction is retrieved by the second scaling module 112 of the image processing circuit 110 from the third image according to the second line-taking position parameter. In step S704, a second scaling process related to the second direction is performed by the second scaling module 112 of the image processing circuit 110 according to at least one line of input pixels of the third image to generate a line of output pixels of the first image disposed in the second direction.

In step S705, whether or not each line of output pixels of the first image is generated is determined by the image processing circuit 110. If not, repeat step S702 to step S704. If yes, in step S706, the image processing circuit 110 obtains the first image. In step S707, the first line-taking position parameter is determined by the image processing circuit 110 according to the ratio of the first target edge length to the second target edge length. In step S708, at least one line of input pixels disposed in the first direction is retrieved by the first scaling module 111 of the image processing circuit 110 from the first image according to the first line-taking position parameter. In step S709, the first scaling process related to the first direction is performed by the first scaling module 111 of the image processing circuit 110 according to at least one line of input pixels of the first image to generate a line of output pixels of the second image disposed in the first direction. In step S710, whether or not each line of output pixels of the second image is generated is determined by the image processing circuit 110. If not, repeat step S707 to step S709. If yes, in S711, the second image is projected by the projection module 110.

Note that, when the image processing circuit 110 performs horizontal scaling process in step S702 to step S704 (for example, the horizontal scaling process shown in FIG. 5), the image processing circuit 110 performs vertical scaling process in step S707 to step S709 (for example, the vertical scaling process shown in FIG. 6). When the image processing circuit 110 performs vertical scaling process in step S702 to step S704 (for example, the vertical scaling process shown in FIG. 6), the image processing circuit 110 performs horizontal scaling process in step S707 to step S709 (for example, the horizontal scaling process shown in FIG. 5).

It is worth noting that in different embodiments, the related functions of the above-mentioned image processing circuit 110 may apply general programming languages (such as C or C++), hardware description languages (such as Verilog HDL or VHDL), or other suitable programming languages to implement software, firmware, or hardware. The software (or firmware) that performs the related functions may be disposed as any known computer-accessible medias, such as magnetic tapes, semiconductor memory, and magnetic disks or compact disks (such as CD-ROM or DVD-ROM). The software (or firmware) may be stored in an accessible medium (such as a memory) of the computer, so that the processor of the computer can access and/or execute the programming codes of the software (or firmware) to perform the related functions.

In summary, in the embodiments of the present disclosure, the projection device implements pre-distortion image processing by performing horizontal scaling process and vertical scaling process, and then the result image produced by the image scaling process is projected onto the projection screen, so that the viewer can view the rectangular projected image from the projection screen. Particularly, by first calculating the line-taking position parameter according to the length of the bottom edge of the target keystone image block, then determining the input pixels for image scaling process according to the line-taking position parameter, the present disclosure prevents the projected image from distortion or deformation after the keystone correction.

Lastly, the above embodiments are only used to illustrate the technical solutions of the disclosure without limiting the disclosure; although the disclosure has been described in detail with reference to the foregoing embodiments, those of ordinary skill in the art should understand that they may still recombine or modify the technical solutions described in each of the foregoing embodiments, or substitute some or all of the technical features with their equivalence; and the entities of those corresponding technical solutions with such combinations, modifications, or substitutions do not deviate from the scope of the technical solutions of the embodiments of the disclosure.

What is claimed is:

1. A keystone correction method, adapted for a projection device, the method comprising:
    obtaining a first image;
    determining a first line-taking position parameter according to a ratio of a first target edge length to a second target edge length;
    retrieving at least one line of input pixels disposed in a first direction from the first image according to the first line-taking position parameter; and
    performing a first scaling process related to the first direction according to the at least one line of input pixels of the first image to generate a line of output pixels of a second image disposed in the first direction, wherein the projection device projects the second image onto a projection screen to display a rectangular projected image,
    wherein determining the first line-taking position parameter according to the ratio of the first target edge length to the second target edge length comprises:
    inputting the ratio, a predetermined image size, and a position coordinate of the line of output pixels in a second direction into a predetermined function to obtain the first line-taking position parameter.

2. The keystone correction method according to claim 1, wherein the first direction comprises a horizontal direction, and the at least one line of input pixels comprises at least one row of input pixels of the first image.

3. The keystone correction method according to claim 1, wherein the first direction comprises a vertical direction, and the at least one line of input pixels comprises at least one column of input pixels of the first image.

4. The keystone correction method according to claim 1, wherein before obtaining the first image, the method further comprises:
    obtaining a third image;
    determining a second line-taking position parameter according to a ratio of a third target edge length to a fourth target edge length; and retrieving at least one line of input pixels disposed in a second direction from the third image according to the second line-taking position parameter, and performing a second scaling process related to the second direction according to the at least one line of input pixels of the third image to generate a line of output pixels of the first image disposed in the second direction, wherein the first direction is perpendicular to the second direction.

5. The keystone correction method according to claim 1, wherein: when the first line-taking position parameter is an integer, a position coordinate of the at least one line of input pixels in the second direction is equal to the first line-taking position parameter; and when the first line-taking position parameter is a non-integer and comprises an integer part, the position coordinate of the at least one line of input pixels in the second direction is equal to the integer part and the integer part plus one.

6. The keystone correction method according to claim 1, wherein determining the first line-taking position parameter according to the ratio of the first target edge length to the second target edge length comprises:

calculating a first image-size parameter and a second image-size parameter according to the ratio and a predetermined image size;

calculating a first line-taking step length according to the first image-size parameter and the predetermined image size, and calculating a second line-taking step length according to the second image-size parameter and the predetermined image size; and calculating and determining the first line-taking position parameter according to the first line-taking step length, the second line-taking step length, and a position coordinate of the line of output pixels in the second direction.

7. The keystone correction method according to claim 1, wherein:

when the first direction is a horizontal direction, an image block of the second image is generated by performing the first scaling process related to the horizontal direction on another image block of the first image, and an image block height of the image block is different from an image block height of the another image block; and when the first direction is a vertical direction, the image block of the second image is generated by performing the first scaling process related to the vertical direction on the another image block of the first image, and an image block width of the image block is different from an image block width of the another image block.

8. The keystone correction method according to claim 1, wherein performing the first scaling process related to the first direction according to the at least one line of input pixels of the first image to generate the line of output pixels of the second image disposed in the first direction comprises:

performing the first scaling process at least according to a m-th line of input pixels of the first image to generate a n-th line of output pixels of the second image, wherein when n is an integer greater than 1 and less than s, n is not equal to m, wherein: when the first direction is a horizontal direction, s is equal to a predetermined image height; and when the first direction is a vertical direction, s is equal to a predetermined image width.

9. A projection device, comprising:

an image processing circuit, adapted to:

obtain a first image;

determine a first line-taking position parameter according to a ratio of a first target edge length to a second target edge length;

retrieve at least one line of input pixels disposed in a first direction from the first image according to the first line-taking position parameter; and perform a first scaling process related to the first direction according to the at least one line of input pixels of the first image to generate a line of output pixels of a second image disposed in the first direction; and a projection module, coupled to the image processing circuit, and adapted to project the second image onto a projection screen to display a rectangular projected image, wherein the image processing circuit is further adapted to: input the ratio, a predetermined image size, and a position coordinate of the line of output pixels in a second direction into a predetermined function to obtain the first line-taking position parameter.

10. A keystone correction method, adapted for a projection device, the method comprising:

obtaining a first image;

determining a first line-taking position parameter according to a ratio of a first target edge length to a second target edge length;

retrieving at least one line of input pixels disposed in a first direction from the first image according to the first line-taking position parameter; and performing a first scaling process related to the first direction according to the at least one line of input pixels of the first image to generate a line of output pixels of a second image disposed in the first direction, wherein the projection device projects the second image onto a projection screen to display a rectangular projected image, wherein determining the first line-taking position parameter according to the ratio of the first target edge length to the second target edge length comprises:

calculating a first image-size parameter and a second image-size parameter according to the ratio and a predetermined image size;

calculating a first line-taking step length according to the first image-size parameter and the predetermined image size, and calculating a second line-taking step length according to the second image-size parameter and the predetermined image size; and calculating and determining the first line-taking position parameter according to the first line-taking step length, the second line-taking step length, and a position coordinate of the line of output pixels in the second direction.

* * * * *